United States Patent [19]

Alexander et al.

[11] Patent Number: 5,612,844
[45] Date of Patent: Mar. 18, 1997

[54] PRISM FOR A DATA CARTRIDGE

[75] Inventors: Jerry L. Alexander, St. Paul Park, Minn.; David L. Tussey, New Richmond, Wis.

[73] Assignee: Imation Corp., St. Paul, Minn.

[21] Appl. No.: 429,427

[22] Filed: Apr. 27, 1995

[51] Int. Cl.⁶ .................................................. G11B 23/02
[52] U.S. Cl. ............................................................ 360/132
[58] Field of Search .......................... 360/132; 369/291; 359/831, 833–837, 614, 599; 242/344

[56] References Cited

U.S. PATENT DOCUMENTS

| | | | |
|---|---|---|---|
| 4,268,985 | 5/1981 | Lecznar | 359/833 |
| 4,607,299 | 8/1986 | Oishi et al. | 360/60 |
| 4,665,456 | 5/1987 | Ahlberg et al. | 360/132 |
| 4,848,698 | 7/1989 | Newell et al. | 242/347 |
| 4,863,114 | 9/1989 | Moeller et al. | 242/333.2 |
| 4,983,496 | 1/1991 | Newell et al. | 430/270 |
| 5,335,131 | 8/1994 | Sato et al. | 242/347 |

FOREIGN PATENT DOCUMENTS

| | | |
|---|---|---|
| 0447644 | 9/1991 | European Pat. Off. . |
| 0499400 | 8/1992 | European Pat. Off. . |
| 0609546 | 8/1994 | European Pat. Off. . |
| 0688019 | 12/1995 | European Pat. Off. . |
| 62-219384 | 9/1987 | Japan . |
| 62-219385 | 9/1987 | Japan . |
| 63-317995 | 12/1988 | Japan . |
| 5-109235 | 4/1993 | Japan . |
| 5-225752 | 9/1993 | Japan . |
| 5-225751 | 9/1993 | Japan . |
| 5-225750 | 9/1993 | Japan . |

Primary Examiner—Stuart S. Levy
Assistant Examiner—David D. Davis
Attorney, Agent, or Firm—Charles L. Dennis, II

[57] ABSTRACT

A prism is provided for deflecting light through the tape information holes in the tape of a data cartridge. The end faces of the prism are diffusing, non-reflective or angled to minimize spurious reflections through the prism.

8 Claims, 2 Drawing Sheets

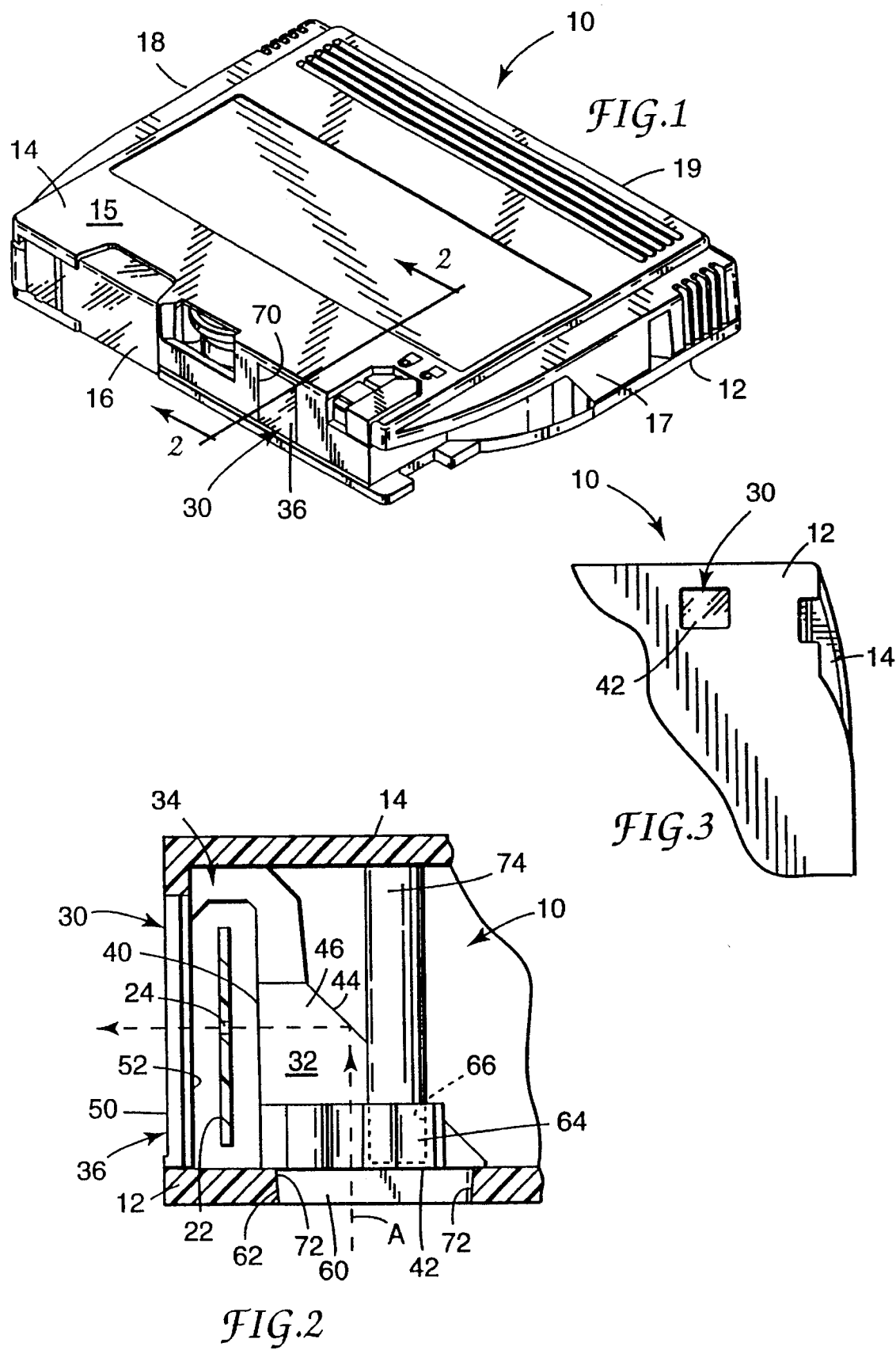

PRISM FOR A DATA CARTRIDGE

BACKGROUND OF THE INVENTION

1. Field of the Invention

The present invention relates to reflective mechanisms for deflecting light through a tape in a data cartridge.

2. Description of the Related Art

Tape in a data cartridge often is provided with holes to serve as codes to the drive in which the data cartridge is to be used. For example, the holes may indicate that the drive has reached the end or beginning of the tape, is nearly at the end or beginning of the tape, or may identify the exact type and length of tape in the cartridge inserted in the drive. The tape itself normally is opaque, and drives usually are provided with a light source and light detector to detect the presence or absence of such holes. Normally, the light is positioned below the cartridge and the detector to the front of the cartridge. The light shines through the top of the cover (which typically is transparent) or through a window cut through the metal baseplate of the data cartridge. It then reflects off of a mirror to redirect it 90° onto the tape. When the tape has a hole in it, the light passes through the hole and out through the front of the transparent cover, where it is detected by a photocell in the drive. In addition, the tape sometimes has multiple holes across its width, and a drive must be able to accurately determine the number of holes based on the amount or position of the light coming through the holes.

In some applications, a prism is substituted for the mirror. For example, co-pending U.S. patent application Ser. No. 08/346,777, filed Nov. 30, 1994, and titled "Prism for a Data Cartridge" describes a potential prism structure. Published European Patent Application 0 499 400 (Minnesota Mining and Manufacturing Company) describes another structure using a prism instead of a mirror, and notes various advantages to using a prism over a mirror.

In some applications, using a prism can pose a problem. As noted, usually light is directed up through the bottom of the cartridge, then angled towards the tape (by the prism or a mirror) and detected at the front of the cartridge after passing through a hole in the tape. However, at least one drive manufacturer routinely directs the light backwards, that is, first shining it through the holes in the tape, then having it angled towards the bottom of the cartridge, and then detecting it at the bottom of the cartridge. This technique works adequately when the cartridge uses a mirror to angle the light, but may cause problems if a prism is used, especially in accurately detecting whether a single hole or multiple holes are present on the tape. These problems may be further exacerbated if the light source and/or the detector are off-center from the prism.

SUMMARY OF THE INVENTION

The present invention is based on the discovery that the reason a prism does not work well when the drive shines light through it backwards (i.e., through the holes in the tape first) or when the light and/or detector are off-center from the prism is that there is too much spurious reflection in the prism. When light shines through the prism in the usual direction (tape last), internal reflection within the prism usually does not matter if the sensors are properly aligned—the sensors in the drive are positioned quite close to the holes in the tape, and any light making it through a hole registers properly to indicate a hole is present. However, when light shines through backwards, each hole acts as a small light source, and the light coming from it can reflect from both the angled face of the prism (as intended) and from the sides of the prism (which is not normally intended). This multiple reflection can appear to the drive sensor to be multiple holes, causing difficulties in determining the actual number of holes present at that location on the tape. The problem is exacerbated when multiple holes actually are present. Similar problems can arise even if the light shines through in the usual direction, if the light source and/or detector are off-center (and therefore closer to the sides of the prism).

According to the present invention, the sides of the prism are frosted, coated, ribbed, textured or otherwise made substantially diffusing or non-reflective to minimize these spurious reflections. Alternatively, the sides are angled such that most reflections from them will be directed substantially away from the detector, or into a frosted portion of the prism, or at least will overlap minimally with the position of the detector.

This principle can also be used with non-triangular prisms, such as those shown in published European Patent Application 0 499 400, by frosting and/or angling portions of the prism which are not intended to reflect light so that spurious reflected light is diffused, absorbed or directed away from the detector.

BRIEF DESCRIPTION OF THE DRAWINGS

The invention will be described further with reference to the following figures in which:

FIG. 1 is a three-quarters perspective view of a data cartridge according to the present invention.

FIG. 2 is a view in partial section along line 2—2 in FIG. 1.

FIG. 3 is partial bottom view of the data cartridge of FIG. 1, showing the window in the base plate.

DETAILED DESCRIPTION OF THE PREFERRED EMBODIMENTS

Figure 4:
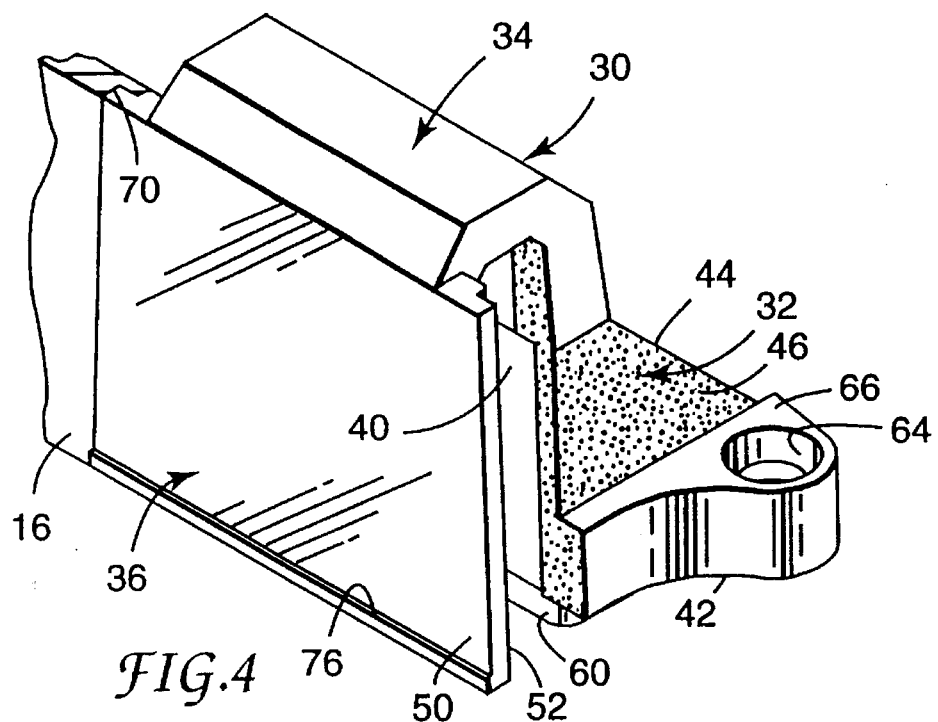
FIG. 4 is a three-quarters perspective view of the one embodiment of a window and prism structure according to the present invention, with part of the wall of a data cartridge.

In FIG. 1, a data cartridge 10 includes a base plate 12 and a cover 14 having top, front, left, right and back sides 15–19, respectively. The base plate 12 and cover 14 assemble to form a data cartridge shell. The shell contains the various components of the data cartridge, for example, tape 22 (visible in FIG. 2). The tape 22 sometimes includes holes 24 at various locations thereon, which a drive using the data cartridge 10 must be able to detect.

A combination prism and window piece 30 is provided for inclusion in the data cartridge. The prism 30 is formed of a transparent material, and generally includes three parts: a main prism body 32, a bridge portion 34, and a window portion 36, as best seen in FIGS. 2 and 4. The main prism body 32 is shown in the drawings as a conventional triangular prism having a first front face 40, a bottom face 42, and a diagonal face 44, as well as two end faces 46 (only one of which is visible in the drawings). While the main prism body 32 is shown as a conventional triangular prism, alternative prism structures could be used, for example, the curved prism structure shown in published European Patent Application 0 499 400 (Minnesota Mining and Manufacturing Company).

The bridge structure 34 extends outwardly from the top of the main prism body 32. If convenient, it may also extend somewhat upwardly, as shown in the drawings.

The bridge portion 34 connects to the window portion 36. The window portion includes first and second faces 50, 52, which roughly parallel the front face 40 of the main prism body 42.

The prism structure 30 further includes a mounting mechanism for accurately positioning the prism body 30 in the data cartridge. Preferably, this includes a pad 60 extending downwardly from the bottom face 42 of the main prism body 32. Sides 62 of the pad are accurately positioned relative to the other components of the prism 30. In addition, flanges 64 with post holes 66 formed therein preferably are formed on the sides of the main prism body 32 (only one such flange is visible in the drawings).

As best seen in FIG. 1, when positioned in the data cartridge, the window portion 36 is positioned in a window opening 70 formed in the cover 14, substantially closing the window opening. Preferably, as best seen in FIG. 4, the edges of the window opening 70 are flanged so that the edges of the window portion 36 can be pulled back against the cover 14 both to help seal the window opening 70 and to help properly position the prism part 30.

The pad 60 fits into the base plate window 72, best seen in FIGS. 2 and 3. The edges of the base plate window 72 can easily be positioned quite accurately relative to the rest of the base plate, since they typically are stamped into the metal plate. Due to the accurate positioning of the sides 62 of the pad 60, positioning the pad 60 in the window 72 will accurately position the pad, and therefore the rest of the prism structure 30, relative to the base plate 12. According to the usual specifications for a normal drive, the base plate 12 is used to accurately position the cartridge 10 as a whole relative to the drive, so that accurately positioning the prism structure 30 relative to the base plate 12 in effect accurately positions it relative to the drive upon insertion of cartridge 10 into the drive.

The post holes 66 in the flanges 64 engage posts 74 which extend downward from the top of the cover 14. Preferably, bridge portion 34 is somewhat flexible, and the spacing of the posts 74 relative to the front face 16 of the cover 14 is such that the window portion 36 is in effect spring biased backwards against the cover 14. The spacing of the pad 60 also (or alternatively) can be such as to assist in this flexing. Preferably, the bottom edge of the window portion 36 is slightly toed towards the main prism body 32, so that the piece in effect is sprung into slight tension (with the faces 50, 52 aligned with the face 40) when inserted into the cover 14.

Once the structure is assembled, light can pass along path A in FIG. 2 up through the base of the main prism body 32, reflect off the diagonal prism face 44, through the hole 24 in the tape 22 and out the transparent window portion 36. Alternatively, light can follow the same course in the opposite direction. If desired, the diagonal prism face 44 could be silvered to enhance reflectivity. It will be noted that since the face 44 is on the outside of the prism 30, it is readily accessible to allow such silvering.

Preferably, a lip 76 is provided at the front of the window portion 36. Similar lips can be provided on the pad 60, or the pad 60 can be slightly hollowed out at its base. Such a structure helps ensure that if the prism 30 is placed on a conveyer belt, it will rest on the lip 76 or the outer edges of the pad 60, and not on the optical significant portions of the prism 30. This allows more flexibility in manufacturing design, while protecting the optically sensitive surfaces of the prism 30.

As will be apparent, light is intended to be reflected from the diagonal prism face 44. To minimize spurious reflection from other surfaces of the prism, they can be frosted, coated, ribbed, textured or otherwise made diffusing or non-reflective, as shown in FIG. 4 for part of front face 40 and end faces 46 of the main prism body 32. Other surfaces of the prism from which reflection is not desired can also be frosted or coated if necessary or helpful to reduce spurious reflections.

Especially with alternative prism structures such as those suggested in published European Patent Application 0 499 400, the portions of the prism which should be frosted may include any portions thereof from which reflection is not intended in the active use in a cartridge. Even with the design in FIG. 4, additional portions (such as the bridge 34 and flanges 66) could be frosted or coated if desired. It also will be appreciated that the "frosted" surfaces can be achieved simply by roughening the corresponding surface of the mold in which the prism is molded.

Figure 5:
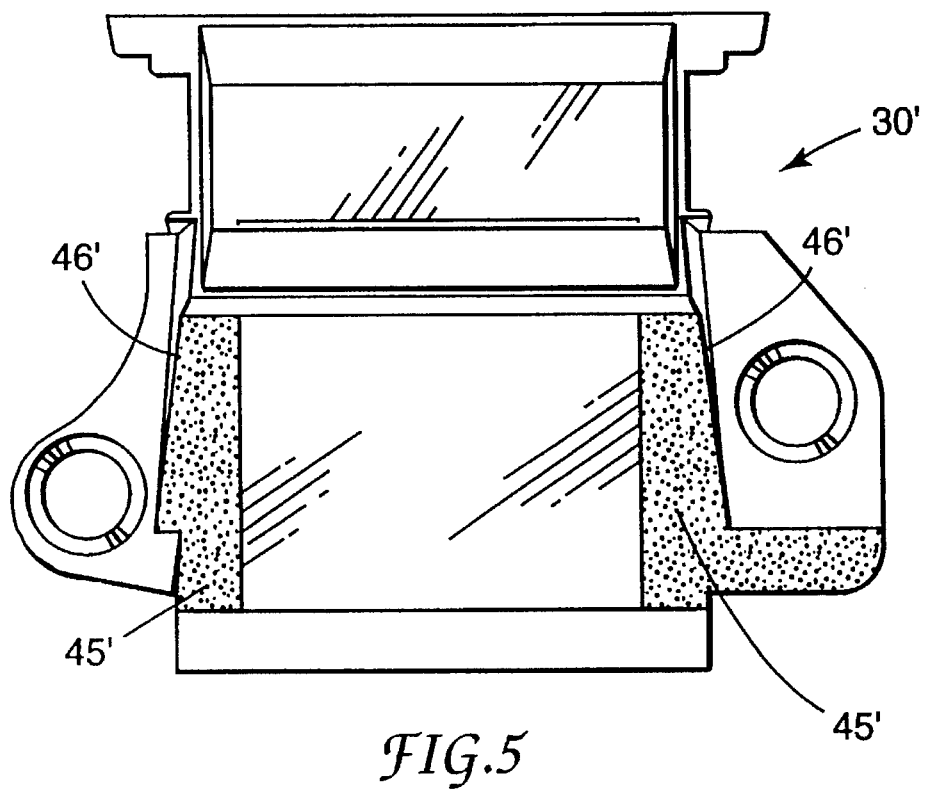
FIG. 5 is a plan view illustrating an alternative embodiment of the prism, in which the sides of the prism are angled.

Depending on mold configuration, frosting the end faces 46 may cause manufacturing problems. An alternative is to angle the end faces, as shown by end faces 46' in the alternative embodiment of a prism 30' shown in FIG. 5. In this alternative embodiment, the end faces 46' are angled relative to the front face of the prism so that light hitting them is redirected from where it would otherwise reflect from end faces perpendicular to the front face. The redirected light can be directed completely away from the detector, or towards a frosted area. Frosted areas can also be provided specifically for this purpose, e.g., frosted areas 45' on the diagonal surface 44'.

A slight draft angle often is included in molds to provide ease in manufacturing. It should be noted that a typical draft angle would provide incorrect redirection required for this alternative embodiment of the present invention. Indeed, the typical draft angle would usually be in the exact opposite direction desired, and would make the problem worse.

It will be understood that these exemplary embodiments in no way limit the scope of the invention. Other modifications of the invention will be apparent to those skilled in the art in view of the foregoing description. For example, the invention has been described with respect to a triangular prism, but could be applied to non-triangular prisms. These descriptions are intended merely to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A data cartridge comprising:

a) a main base plate having a base plate window formed therein;

b) a cover having top, front, right, left and back sides arranged generally in a rectangular configuration and mounted to the main base plate to define a data cartridge shell, one side of the cover having a cover window opening formed therein;

c) a prism mounted inside the data cartridge shell contiguous to the base plate window, the prism comprising a transparent main prism body having:

i) a first face with a first end and a second end;
ii) a second face with a first end and a second end, the second face being substantially perpendicular to the first face, and the first ends of the first and second faces abutting one another;
iii) a third face contiguous to the second ends of the first and second faces; and
iv) two sides extending between and connecting the first, second and third faces, the sides being substantially diffusing, non-reflective or angled to substantially minimize reflection by the sides of light entering through the first or second faces toward the other of the second or first faces, substantially minimizing spurious reflection of light in either direction along a path between the first face, one of the sides, the third face and the second face.

2. The data cartridge of claim 1, wherein the prism further comprises:

i) a bridge portion extending outwardly from the main prism body contiguous to the second end of the first face;
ii) a transparent window portion spaced from the main prism body and extending downwardly from the bridge portion.

3. The data cartridge of claim 1, further comprising tape contained within the data cartridge shell and extending between main prism body and the window portion of the prism.

4. The prism of claim 1, wherein the sides of the main prism body are frosted to be diffusing.

5. The prism of claim 1, wherein the sides of the main prism body are coated to be non-reflective.

6. The prism of claim 1, wherein the sides of the main prism body are angled to deflect light passing through the either the first or second face and striking the sides away from the other of the second or first face.

7. The prism of claim 6, wherein portions of the second face near the sides of the main prism body are diffusing or non-reflective, and the sides of the main prism body are angled to deflect light passing through either the first or second face towards these second face portions.

8. The prism of claim 1, wherein portions in addition to the sides of the main prism body are diffusing, non-reflective or angled to substantially minimize reflection by the sides of light entering through the first or second faces toward the other of the second or first faces.

* * * * *